April 2, 1935. F. R. HOUSE 1,996,514
NOISE REDUCING MEANS FOR SOUND LOCATOR SEARCHLIGHT SYSTEMS
Filed June 28, 1934 2 Sheets-Sheet 1

INVENTOR
FRANK R. HOUSE
BY
Herbert H. Thompson
HIS ATTORNEY.

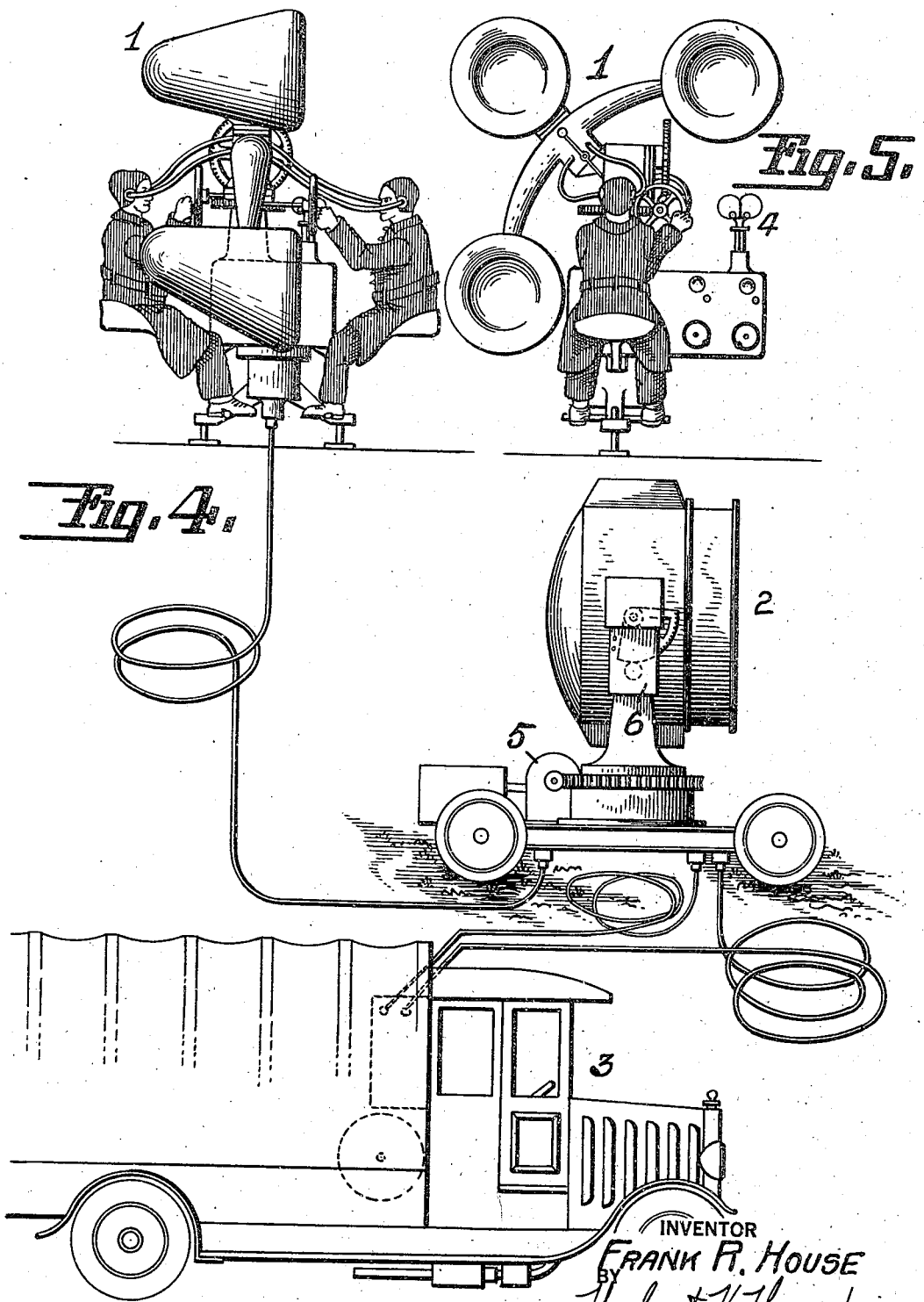

Patented Apr. 2, 1935

1,996,514

UNITED STATES PATENT OFFICE 1,996,514

NOISE REDUCING MEANS FOR SOUND LOCATOR-SEARCHLIGHT SYSTEMS

Frank R. House, Baldwin Harbor, N. Y., assignor to Sperry Gyroscope Company, Inc., Brooklyn, N. Y., a corporation of New York Application June 28, 1934, Serial No. 732,860

5 Claims. (Cl. 240—1)

This invention relates to the problem of locating aircraft at night by means of sound, so that anti-aircraft searchlights and batteries may be trained upon the same. The present practice is to employ a plurality of portable units comprising a sound locator, a searchlight, and a searchlight truck, the latter not only transporting the searchlight and possibly hauling the sound locator as a trailer, but also supplying current for operation of the remote control and indicator systems between the sound locator and searchlight, and for the operation of the searchlight itself. As outlined in the prior patent to M. L. Patterson, No. 1,622,392, dated March 29, 1927, the truck engine is preferably also employed for driving the electric generator for generating current for the above named purposes, a clutch being employed for coupling and uncoupling the generator from the crank shaft.

The problem of locating aircraft at night, however, is becoming more and more difficult as the airplanes are being silenced by the use of reduced speed propellers, engine muffling, etc., so that it becomes very important to reduce all sounds near the sound locator to a minimum. The present invention is designed to reduce the noise from the truck engine and generator. Extreme silence is especially desirable during the so-called tracking period. The first warning of the approach of aircraft is usually telephoned in from listening outposts several miles away. The sound locator is then manned and the power plant started in readiness for the expected attack, at which time current is required for operating the remote control and data electric circuits, and it is during this period that the least possible noise is desired. The searchlight is not turned on until the aircraft is approximately located, so that after the searchlight is on, silence is not so essential, because aircraft may then be picked up by the eye, or at least the aircraft is then closer and the noise emitted greater. According to my invention, I therefore propose to provide an automatic speed control of the engine to maintain the speed very low during the tracking period, and to only speed it up to full speed when the searchlight is turned on, requiring heavy current.

As a further means to the same end I may provide an extra muffler which may be cut in during the tracking period and which is eliminated when the truck is on the road or, if desired, when the searchlight is in operation.

Referring to the drawings showing one form my invention may assume,

Fig. 4 shows a diagram of the complete sound locator-searchlight system in use.

Fig. 5 is a front elevation of the sound locator taken at right angles to Fig. 4.

Figure 1:
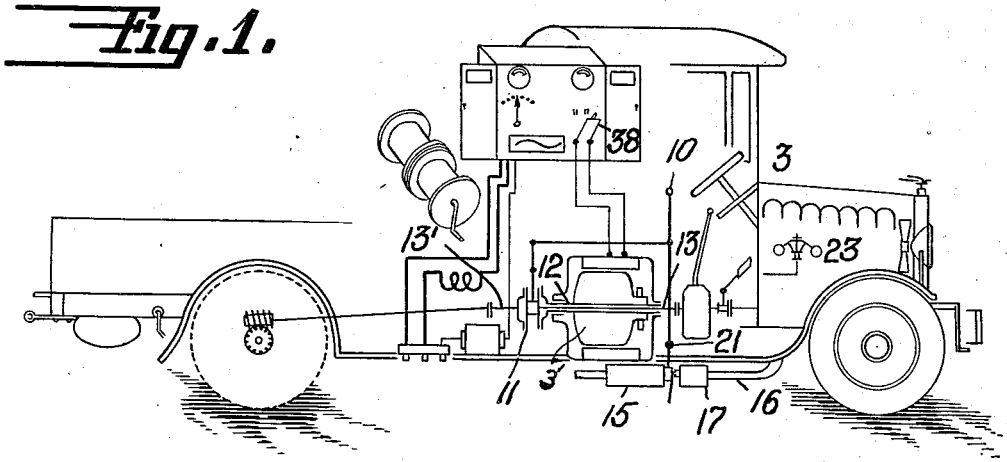
Fig. 1 is a diagrammatic view of the searchlight truck and generating set.

As set up on the field, the system comprises a sound locator 1, at which the listeners are located, a searchlight 2 and a generating truck or unit 3, each spaced from the other several hundred feet. The sound locator preferably also is provided with binoculars 4 to follow the target after being picked up by the sound locating horns. The position of the searchlight is controlled automatically or semi-automatically from the sound locator by a remote electric control system with azimuth and elevation transmitters at the sound locator actuating azimuth and elevation motors or indicators 5 and 6 at the searchlight. The electric power for operating said system is supplied from the truck unit 3 both before and after the searchlight is turned on. The searchlight truck is shown as provided with a generator operating handle 10, pivoted at 21, which serves to throw in and out the clutch 11 coupling the quill shaft 12 of the generator through the forward drive shaft 13 of the truck and at the same time uncoupling said forward drive shaft from the rear portion 13' thereof.

Figure 3:
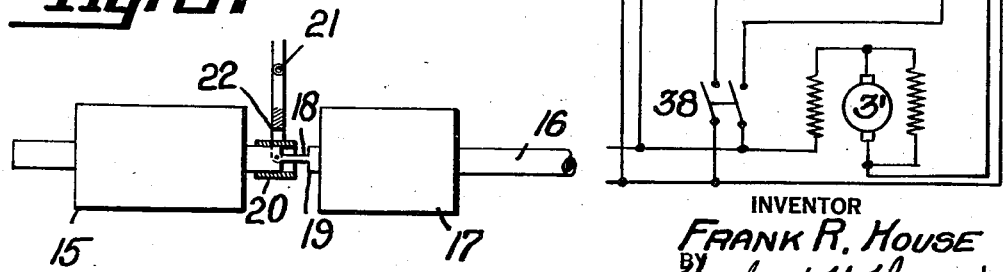
Fig. 3 is a side elevation of the regulator and auxiliary muffler employed, with the cut-out means therebetween.

Said handle 10 may also operate to cut in an auxiliary muffler 15 so as to lessen the noise when the engine is operating the generator 3'. The manifold pipe 16 is shown as entering the regular muffler 17, the muffler discharging normally through cut-out openings 18 in the exhaust pipe 19. There is shown a sleeve 20 slidably mounted on said pipe so as to close said opening 18 when the sleeve is moved to the right in Fig. 3, so that an auxiliary muffler 15 connected thereto may be thrown in by this means. For this purpose the operating lever 10 may be provided with a downwardly extending fork 22, pinned to sleeve 20 so that when said lever 10 is moved to throw in the generator, the auxiliary muffler 15 is automatically thrown in, and when the generator is thrown out, it is likewise cut out.

The engine is shown as provided with a speed governor 23 for limiting the speed of the engine. In prior constructions the governor was set so as to permit a sufficient speed at all times to produce the heavy current required for the searchlight. According to my invention, however, I provide a means for maintaining a reduced speed and consequently a low noise level when only small current is required for operating the remote control, but provide an automatic means for raising the speed to full power when the arc is started. The generator is also preferably so compounded that a constant voltage is maintained throughout the range of engine speed. For these purposes there is shown a solenoid armature 24 differentially connected to the engine governor 23 so that the throttle or butterfly valve 25 in the engine intake 26 assumes a different position under the two conditions. The valve 25 is represented as pivoted at 27 and is rotated by the rotation of the arm or lever 28 which is pivoted at 29 to a lever or link 30. At its lower end said link is shown as connected through a rod 31 to a core 24 of the solenoid 32. At its other end said link 30 is shown connected through a rod 33 to a bell crank lever 34, the position of which is controlled by the governor 23. A stop screw 40 or its equivalent is for the purpose of preventing the engine speed from falling below a desired minimum, which may be little more than idling speed.

Figure 2:
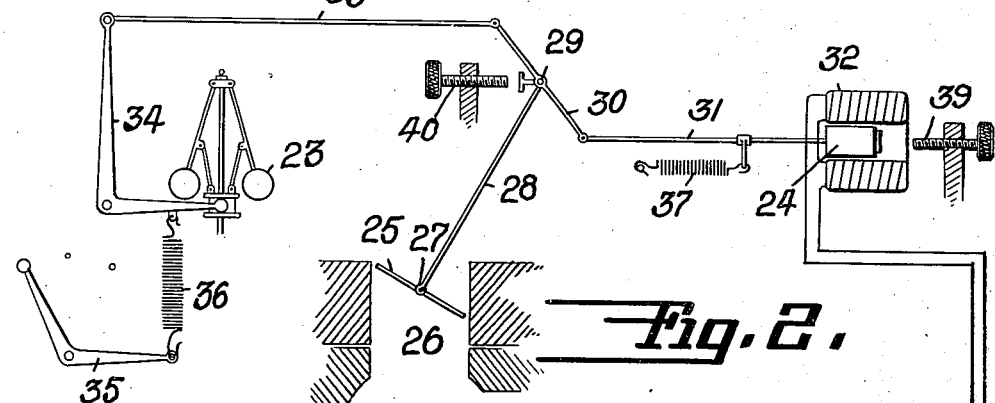
Fig. 2 is a diagrammatic view of the engine governor thereof.

The sensitivity of the governor may be adjusted by means of bell crank lever 35, connected by spring 36 to lever 34, and the outer end of which may be adjusted to various locking positions. When only a small amount of current is passing through the solenoid 32, the core 24 will remain in the position shown in Fig. 2 by reason of the pull of the tension spring 37. When, however, the searchlight circuit is closed by closing the main switch 38, the increased current to solenoid 32 will pull the core to the right against the stop 39, thus rotating the lever 28 clockwise in Fig. 2, assuming the governor to remain stationary for the moment, and thus increasing the engine speed until the governor moves lever 33 to the right sufficiently to prevent further increase. In my invention, therefore, the noise of the generating set is greatly reduced during the critical searching operation by maintaining a minimum engine speed at that time and by throwing in the extra muffler.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a sound locator-searchlight system for nocturnal anti-aircraft use, the combination with a sound locator, searchlight and engine driven generator, an electric remote control system between the locator and searchlight, said generator supplying current for both said system and the searchlight, a speed governor for maintaining a slow engine speed before the searchlight is turned on to maintain a low sound level, and automatic means responsive to the increased current required by the searchlight for altering the governor regulation to raise the speed to full power.

2. In a sound locator-searchlight system for nocturnal anti-aircraft use, the combination with a sound locator, searchlight and engine driven generator, an electric remote control system between the locator and the searchlight, said generator supplying current for both said system and the searchlight, a dual speed range governor for said engine, and automatic means for shifting from the higher to the lower range when the heavy searchlight current is not being drawn from said generator, to reduce engine noise.

3. In a sound locator-searchlight system for nocturnal anti-aircraft use, the combination with a sound locator, searchlight and searchlight generator truck, an electric remote control system between the locator and searchlight, said generator supplying current for both said system and the searchlight, means for minimizing the noise of said truck engine comprising a speed governor for maintaining a slow engine speed before the searchlight is turned on, automatic means responsive to the increased current required by the searchlight for altering the governor regulation to raise the speed to full power, an auxiliary muffler, and means for throwing said muffler in when said generator is operating.

4. In a sound locator-searchlight system for nocturnal anti-aircraft use, the combination with a sound locator, searchlight and engine driven generator, an electric remote control system between the locator and searchlight, said generator supplying current for both said system and the searchlight, a dual speed range governor for said engine, automatic means for shifting from the higher to the lower range when the heavy searchlight current is not being drawn from said generator, to reduce noise, an auxiliary muffler, and means for also throwing in the same to further reduce the engine noise.

5. In a sound locator-searchlight system for nocturnal anti-aircraft use, the combination with a sound locator, searchlight and engine driven generator, an electric remote control system between the locator and searchlight, said generator supplying current for both said system and the searchlight, a speed control for maintaining a slow engine speed before the searchlight is turned on to maintain a low sound level, and automatic means responsive to the increased current required by the searchlight for raising the speed to full power.

FRANK R. HOUSE.